United States Patent
Watabe

(10) Patent No.: US 8,997,811 B2
(45) Date of Patent: Apr. 7, 2015

(54) STUDLESS TIRE

(75) Inventor: Ryoichi Watabe, Nakano-ku (JP)

(73) Assignee: Bridgestone Corporation, Tokyo (JP)

( * ) Notice: Subject to any disclaimer, the term of this patent is extended or adjusted under 35 U.S.C. 154(b) by 274 days.

(21) Appl. No.: 13/003,276

(22) PCT Filed: Jul. 9, 2009

(86) PCT No.: PCT/JP2009/062543
§ 371 (c)(1),
(2), (4) Date: Jan. 7, 2011

(87) PCT Pub. No.: WO2010/005057
PCT Pub. Date: Jan. 14, 2010

(65) Prior Publication Data
US 2011/0120608 A1 May 26, 2011

(30) Foreign Application Priority Data
Jul. 10, 2008 (JP) ................. 2008-180350

(51) Int. Cl.
*B60C 11/117* (2006.01)
*B60C 11/03* (2006.01)
(Continued)

(52) U.S. Cl.
CPC ............ *B60C 11/033* (2013.04); *B60C 11/11* (2013.01); *B60C 2011/0353* (2013.04); *B60C 11/12* (2013.01); *B60C 11/0304* (2013.04);
(Continued)

(58) Field of Classification Search
CPC ...... B60C 11/033; B60C 11/12; B60C 11/11; B60C 2011/0381; B60C 2011/1213; B60C 2011/1254; B60C 2011/0353
USPC ......... 152/209.2, 209.3, 209.8, 209.9, DIG. 3
See application file for complete search history.

(56) References Cited

U.S. PATENT DOCUMENTS 4,546,808 A * 10/1985 Fontaine et al. ............ 152/209.9
4,905,748 A * 3/1990 Kukimoto et al. ......... 152/209.5
(Continued)

FOREIGN PATENT DOCUMENTS

EP 2202098 A1 * 6/2010 ............. B60C 11/12
FR 2 800 015 A1 4/2001
(Continued)

OTHER PUBLICATIONS

Machine translation of JP07-186618 (no. date).*
(Continued)

*Primary Examiner* — Richard Crispino
*Assistant Examiner* — Philip N Schwartz
(74) *Attorney, Agent, or Firm* — Sughrue Mion, PLLC

(57) ABSTRACT

Provided is a studless tire capable of achieving both the traction performance and the steering stability at the time of traveling on the ice and snow at a high level.

A tread surface 10 is disposed on the studless tire such that, among lateral grooves 3A, 3B, 3C, 3D, 5 extending in an axial direction within each block array 2A, 2B, 2C, 2D, an axial length of a lateral groove 3A, 3B, 3C, 3D opening to at least one straight circumferential groove 1, 1A, 1B adjacent to the block array provided with the lateral groove is referred to as a groove edge component, a proportion of the total length of the groove edge components on the inner tread surface IN to the total length of the groove edge components on the outer tread surface OUT is 1.03-1.3, and, a proportion of a negative ratio of the outer side surface OUT to a negative ratio of the inner side surface IN is 0.85-1.0.

4 Claims, 1 Drawing Sheet

(51) Int. Cl.
*B60C 11/12* (2006.01)
*B60C 11/11* (2006.01)

(52) U.S. Cl.
CPC . *B60C2011/1213* (2013.04); *B60C 2011/1254* (2013.04); *B60C 2011/0381* (2013.04); *Y10S 152/03* (2013.01)

(56) References Cited

U.S. PATENT DOCUMENTS

| | | | |
|---|---|---|---|
| 6,607,018 | B1 | 8/2003 | Fukunaga et al. |
| 2005/0257870 | A1 | 11/2005 | Ohsawa et al. |
| 2006/0137789 | A1* | 6/2006 | Shirouzu .................... 152/209.8 |
| 2009/0188595 | A1* | 7/2009 | Kishizoe .................... 152/209.8 |

FOREIGN PATENT DOCUMENTS

| | | | | | |
|---|---|---|---|---|---|
| JP | 63-159108 | A | | 7/1988 | |
| JP | 07186618 | A | * | 7/1995 | .............. B60C 11/00 |
| JP | 11-321240 | A | | 11/1999 | |
| JP | 2004-90798 | A | | 3/2004 | |
| JP | 2006-297991 | A | | 11/2006 | |
| JP | 2006-297992 | A | | 11/2006 | |
| WO | WO2008026255 | | * | 3/2008 | .............. B60C 11/04 |
| WO | WO 2009/038131 | | * | 3/2009 | .............. B60C 11/04 |

OTHER PUBLICATIONS

Korean Office Action dated Sep. 14, 2012 issued in Korean Patent Application No. 10-2011-7003018.
International Search Report of PCT/JP2009/062543 dated Aug. 25, 2009.
European Office Action issued in European Application No. 09 79 4501, dated Aug. 17, 2011.
Chinese Office Action issued in Chinese Application No. 200980132946.0 dated Jan. 11, 2013.
Korean Office Action, dated Mar. 28, 2013, issued in corresponding Korean Application No. 10-201107003018.
Japanese Office Action, dated May 14, 2013, issued in corresponding Japanese Patent Application No. 2010-519819.

\* cited by examiner

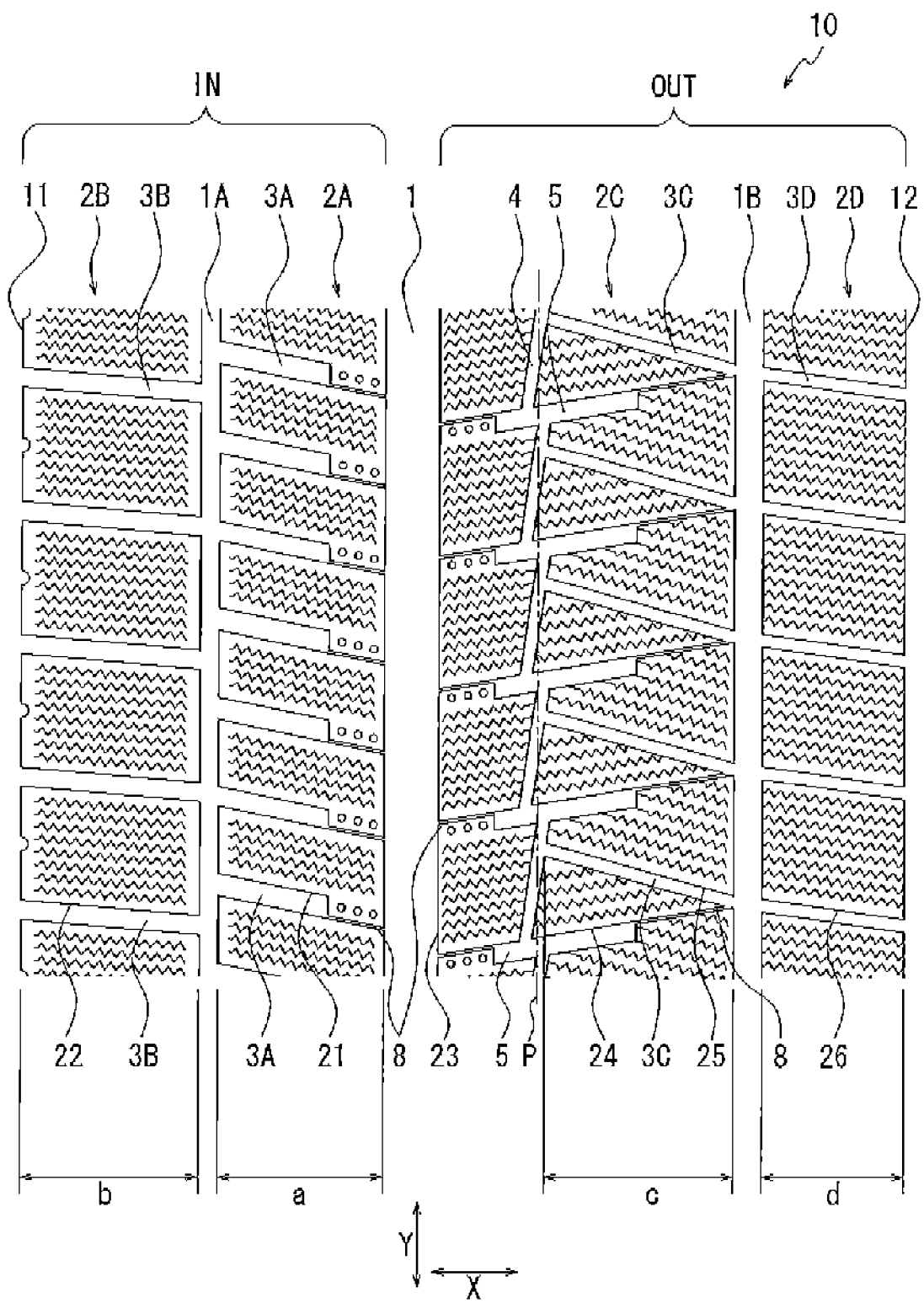

STUDLESS TIRE

TECHNICAL FIELD

The present invention relates to a studless tire having, on a tread surface, plural straight circumferential grooves extending straightly in the circumferential direction and a tread surface end, thereby to define a block array formed by plural blocks arranged in the circumferential direction, and in particular, to a studless tire having improved steering stability while maintaining fraction performance necessary for traveling on ice and snow.

RELATED ART

A studless tire needs to have enhanced water discharging performance while maintaining traction performance and braking performance at the time of traveling on ice and snow. There has been known a studless tire having a tread pattern in which plural block arrays formed by blocks arranged in the circumferential direction are disposed in the width direction of the tire. However, in addition to the performances described above, it is also important for the studless tire to have improved steering stability at the time of traveling on snow, icy and dry roads. In order to achieve all the performances described above, there has been also proposed a asymmetry tire having different patterns and having different functions between an inner tread surface corresponding to the inside of a vehicle and an outer tread surface in a position where the tire is attached to the vehicle (see, for example, Patent Literature 1).

REFERENCE DOCUMENT

Patent Literature

Patent Literature 1: Japanese Patent Application Laid-open No. 11-321240

SUMMARY OF THE INVENTION

Problems to be Solved by the Invention

However, the conventional asymmetry tire did not have sufficiently optimized characteristics on the inner tread surface and the outer tread surface, and thus, both of the fraction performance and the steering stability at the time of traveling on ice and snow were not sufficiently achieved at the same time.

The present invention has been made in view of the problems described above, and an object of the present invention is to provide a studless tire capable of achieving both of traction performance and steering stability at the time of traveling on ice and snow on a high level.

Means for Solving the Problem

The present invention provides a studless tire having, on a tread surface, a plurality of straight circumferential grooves extending straightly in the circumferential direction and a tread surface end, thereby to define block arrays formed by a plurality of blocks arranged in the circumferential direction, the tread surface being divided by the widest groove among the straight circumferential grooves into an inner tread surface located on the inner side of a vehicle in a state where the tire is mounted on the vehicle, and an outer tread surface located on outer side of the vehicle in the state where the tire is mounted on the vehicle, wherein, when, among lateral grooves extending in an axial direction of the tire within each of the block arrays, an axial length of a lateral groove opening to at least one straight circumferential groove adjacent to the block array provided with the lateral groove is referred to as a groove edge component, a proportion (A) of the total length of the groove edge components on the inner tread surface to the total length of the groove edge components on the outer tread surface is 1.03-1.3, and, a proportion (B) of a negative ratio of the outer tread surface to a negative ratio of the inner tread surface is 0.85-1.0.

In the present invention, it is preferable that the proportion of the negative ratio on the outer side surface to the negative ratio on the inner side surface is 0.97 or lower.

Effect of the Invention

According to the present invention, it is possible to achieve both the traction performance and the steering stability at the time of traveling on the ice and snow at a high level, by setting a proportion (A) of the total length of the groove edge components on the inner tread surface t to the total length of the groove edge components on the outer tread surface at a range of 1.03 to 1.3, and setting a proportion (B) of a negative ratio of the outer side surface to a negative ratio of the inner tread surface at a range of 0.85 to 1.0.

The groove edge component is a component for generating the fraction with the edge of the block, and the larger length of the axial component of the groove existing within the road-contacting surface yields the larger traction force by the edge effect. However, the excessively large groove edge component renders the sizes of the respective blocks undesirably small, so that the rigidity of the blocks deteriorates and the block collapsing phenomenon occurs, which adversely reduces the traction.

It is possible to improve the traction performance by making the total length of the groove edge component on the inner tread surface longer than that on the outer tread surface because the characteristic of the inner tread surface has larger effect on the fraction performance as compared with the characteristic of the outer tread surface. However, in a case where the difference between the inner side and the outer side is made too large, the traction deteriorates due to collapsing of the block as described above. More specifically, it is necessary to set the proportion (A) of the total length of groove edge component at the range of 1.03 to 1.3, and the sufficient fraction cannot be obtained at the time of traveling on the ice and snow when the ratio (A) is less than 1.03 or more than 1.3.

The negative ratio affects the performance of the pattern rigidity of the tread surface. By setting the negative ratio larger, sufficient withstanding force can be obtained without the block being deformed against the large input force at the time of cornering, which improves the steering stability.

Since the characteristics of the outer tread surface have the predominant role as compared with the characteristics of the inner tread surface in terms of the steering stability such as responsivity at the time of cornering and withstanding performance at the time of traveling a curve, the steering stability can be improved by making the negative ratio of the outer side smaller than the negative ratio of the inner side. More specifically, it is necessary to set the proportion (B) of the negative ratio at 1.0 or lower, and the sufficient steering stability cannot be obtained when the proportion (B) of the negative ratio exceeds 1.0. Preferably, the proportion (B) of the negative ratio is 0.97 or lower, and the effect of improving the steering stability decreases when the proportion (B) exceeds 0.97.

However, when the proportion (B) is too high, the amount of the grooves decreases, deteriorating the traction performance and the performance of suppressing the hydroplaning. Therefore, it is necessary to set the proportion (B) at 0.85 or more, and the fraction performance is affected when the proportion (B) is less than 0.85.

BRIEF DESCRIPTION OF THE DRAWINGS

FIG. 1 is a development view illustrating a tread surface of a studless tire according to the present invention.

MODE FOR CARRYING OUT THE INVENTION

With reference to the drawings, a studless tire according to an embodiment of the present invention will be described below. FIG. 1 is a development view illustrating a tread surface of this studless tire that has been developed. On a tread surface 10, there are formed plural (three grooves in FIG. 1) straight circumferential grooves 1, 1A, 1B extending straightly in the circumferential direction (Y direction), and block arrays 2A, 2B, 2C, 2D are defined by the straight circumferential grooves 1, 1A, 1B, and tread surface ends 11, 12 on the respective sides of the tread surface.

The tread surface 10 is divided, in a tire axis direction, into two portion having different functions from each other by the main groove 1 having the widest groove width among the straight circumferential grooves 1, 1A, 1B. In this specification, in a state where the tire is mounted on the vehicle, a tread portion located on the inner side, that is, on the center side of the vehicle is referred to as an inner tread surface IN, and a tread portion located on the outer side of the vehicle is referred to as an outer tread surface OUT.

In this specification, the tread surface represents a portion of a tire obtained by making a circuit of the widest portion in a road-contacting portion of a tread in the circumferential direction, under a condition where the tire is assembled with a predetermined rim and a predetermined static load is applied to a tire that has been inflated at a predetermined inner pressure. Explanations of the predetermined load, the predetermined inner pressure and the predetermined rim in this specification will be made below.

More specifically, the predetermined load represents a maximum load (maximum load capacity) per wheel with an applicable size specified under a predetermined industrial standard; the predetermined inner pressure represents a pneumatic pressure corresponding to the maximum load (maximum load capacity) per wheel with the applicable size specified under said industrial standard; and the predetermined rim represents a standard rim (or "approved rim," "recommended rim") with the applicable size specified under said predetermined industrial standard. Said industrial standard is an industrial standard effective in a region where the tire is manufactured or used, and these industrial standards are specified, for example, in "The Tire and Rim Association Inc. Year Book" (including a design guide) in the United States, "The European Tyre and Rim Technical Organisation Standards Manual" in Europe, and "JATMA YEAR BOOK" by The Japan Automobile Tyre Manufacturers Association in Japan.

The straight circumferential groove extending straightly in the circumferential direction is defined such that, in a case where there exist a plane orthogonal to a tire axis and crossing a circumferential groove without intersecting a land portion over the entire circumference, this circumferential groove is the straight circumferential groove. For example, in FIG. 1, a circumferential groove 4 (extending between the straight circumferential grooves 1 and 1B) extending in the circumferential direction in a zigzag manner is not the straight circumferential groove because any plane P orthogonal to the tire axis does not cross this circumferential groove over the entire circumference. On the contrary, in a case an edge of a groove or central line of a groove width extends in the circumferential direction in a slightly meandering manner, and there exists a plane orthogonal to the tire axis and crossing a circumferential groove over the entire circumference, this circumferential groove is the straight circumferential groove. As can be clearly understood from the description below, the straight circumferential groove is distinguished from the other circumferential grooves because this closely relates to water discharge performance, and the straight circumferential groove has significantly excellent water discharge performance as compared with the other circumferential grooves.

In each block array 2A, 2B, 2C, 2D, there are arranged, in the circumferential direction, six types of blocks 21-26 sectioned by lateral grooves 3A, 3B, 3C, 3D, 5 extending in the tire axis direction (X direction) and the circumferential groove 4. The blocks 21 sectioned by the lateral groove 3A are arranged in the block array 2A; the blocks 22 sectioned by the lateral groove 3B are arranged in the block array 2B; three types of blocks 23, 24, 25 sectioned by the lateral groove 3C, 5 and the circumferential groove 4 are arranged in the block array 2C; and, the blocks 26 sectioned by the lateral groove 3D are arranged in the block array 2D.

Among the lateral grooves extending in the width direction in the respective block arrays 2A, 2B, 2C, 2D, 5, the lateral groove 3A has, at a portion that connects with the straight circumferential groove 1, a closing groove 8 that has an extremely narrow groove width and closes at the time when this portion is brought into contact with the road surface. Similarly, the lateral groove 5 has the closing groove portion 8 at the respective ends thereof. Of the lateral grooves 3A, 3B, 3C, 3D, 5, with a definition that a substantially opening lateral groove is a groove connecting to at least one of the straight circumferential grooves 1, 1A, 1B by way of a groove portion other than the closing groove portion 8 and substantially opening to the straight circumferential grooves 1, 1A, 1B in a state where this groove is brought into contact with the road surface, only the 3A, 3B, 3C and 3D are the substantially opening lateral groove, and these lateral grooves can discharge water retained in the road-contacting surface through the straight circumferential grooves 1, 1A, 1B, contributing to discharging the water in the state where the grooves are brought into contact with the road surface.

The first requirement of the feature of the present invention is that, with a definition that a groove edge component is a length of the substantially opening lateral groove extending in the axial direction (x direction), in other words, a projected length obtained by projecting the substantially opening lateral groove on a line parallel to the axial direction in a plane (the tread surface in this case) containing the substantially opening lateral groove, a proportion (A) of the total length of the groove edge components on the inner tread surface IN defined above to the total length of the groove edge components on the outer tread surface OUT is 1.03-1.3. This will be explained with reference to FIG. 1. The substantially opening lateral grooves existing on the inner tread surface IN are grooves 3A and 3B, and the groove edge components thereof are a and b, respectively. The substantially opening lateral grooves existing on the outer tread surface OUT are grooves 3C and 3D, and the groove edge components thereof are c and d, respectively. The first requirement of the feature of the present invention can be expressed by the following expression (1) where n1, n2, n3, and n4 are the numbers of the substantially opening lateral grooves 3A, 3B, 3C, 3D, respectively, existing on the tread surface 10 over the entire circumference.

[Expression 1]

$$1.03 \leq \frac{a \cdot n1 + b \cdot n2}{c \cdot n3 + d \cdot n4} \leq 1.3 \quad (1)$$

In a case of the tread surface illustrated in FIG. 1, n2, n3 and n4 are the same, and n1 is 1.5 times as much as them. Therefore, the expression (1) can be expressed by the following expression (2).

[Expression 2]

$$1.03 \leq \frac{3a + 2b}{2(c + d)} \leq 1.3 \quad (2)$$

As explained above, this expression is based on the fact that the characteristics of the inner side surface IN have the predominant role in terms of the traction performance at the time of traveling on the ice and snow; this traction performance is largely affected by the characteristics of the total length of a groove edge component existing in the road-contacting surface; as the component becomes larger, the edge effect of the block increases and the fraction performance improves; and, on the other hand, when the total length becomes too long, the block rigidity deteriorates and the block collapses, resulting in deterioration of the traction performance.

It should be noted that, in the explanation above, although the lateral groove 5 opening to the straight circumferential grooves 1, 1B only through the closing groove portion 8 is open to the circumferential groove 4 at a portion other than the closing groove portion 8, the lateral groove 5 is not included in the substantially opening lateral groove and does not contribute to the edge component. This is because the circumferential groove 4 has a large zigzag shape, and is not included in the straight circumferential groove in terms of the definition made above. Further, in reality, the lateral groove 5 does not have high water-discharging performance as described above, and provides only a small contribution to the fraction performance because the respective blocks are substantially connected with each other in a state where water is retained in the groove.

The second requirement of the feature of the present invention is that a proportion (B) of a negative ratio of the outer tread surface to a negative ratio of the inner tread surface is 0.85-1.0, and more preferably, is less than or equal to 0.97.

The negative ratio of the inner tread surface IN (outer tread surface OUT) represents a negative ratio N (%) defined by the following expression (3).

$$N = (1 - Ar/An) \times 100(\%) \quad (3)$$

The Ar is an actual road-contacting area of the inner tread surface IN (outer tread surface OUT) under a condition where a predetermined load is statically applied on a tire inflated at a predetermined inner pressure. The An is an area of the inner tread surface IN (outer tread surface OUT) surrounded by an outer contour line of the road-contacting portion of the tread under the same condition. The definitions explained above are applied to the predetermined load, the predetermined inner pressure and the predetermined rim described above.

This expression (3) is based on the face that, as explained above, the steering stability is largely affected by the characteristics of the outer tread surface OUT and the characteristic of the negative ratio in the road-contacting surface; the pattern rigidity increases and the steering stability improves as the negative ratio becomes smaller and the land portion becomes wider; and, on the other hand, in a case where the negative ratio is too small, the amount of the groove is too small, which adversely affects the fraction performance and the function of suppressing the hydroplaning phenomenon on the wet road.

EXAMPLE

Eight tires are prepared as samples. Example 3 has a tread pattern illustrated in FIG. 1. Each of Examples 1, 2, 4-6 and Comparative Examples 1-10 has a ratio of the number of blocks in the center block array 2C on the outer tread surface, that is, the number of the substantially opening lateral groove 3C with respect to the other block arrays (which is indicated as a ratio of the number of the lateral groove in Table 1 and Table 2) which is identical with or different from that of Example 3 as shown in Table 1 or 2; a position of the tire circumferential groove which is identical with or different from that of Example 3 to have a groove-edge-component total length proportion (A) as shown in Table 1 or 2; and a width of the substantially opening lateral groove which is identical with or different from that of Example 3 to have a negative ratio as shown in Table 1 or 2. Table 1 shows the negative ratio, the groove-edge-component total length proportion (A) and the lateral groove number ratio of each of the tires.

It should be noted that, as for the negative ratio in Table 1 and Table 2, Nin represents a negative ratio of the inner tread surface IN; Nout represents a negative ratio of the outer tread surface OUT; and, Nout/Nin represents a ratio thereof. Further, the groove-edge-component total length ratio in Table 1 means, in a precise sense, a proportion (A) of the total length of the groove edge component of the inner tread surface to the total length of the groove edge component of the outer tread surface, and the lateral groove number ratio in Table 1 means a ratio of the total number of the substantially opening lateral groove in the block array 2C with respect to the total number of the substantially opening lateral groove on the circumference of any of the block arrays 2A, 2B, 2D, which are set equal.

It should be noted that the common characteristics of the prepared eight tires are as follows:

Size of tires: 195/65R15

Total number of substantially opening lateral grooves in block arrays 2A, 2B, 2D on circumference: 56

Various evaluations shown in Table 1 and Table 2 were made on the sample tires. These evaluations were made on the tires that were assembled with the predetermined rim, were inflated at the predetermined inner pressure, and were mounted to an actual vehicle. Note that these predetermined inner pressure and the predetermined rim are those specified in the description above. Note that the vehicle used in this test was a front-wheel drive vehicle, and the applied load was 120 kg, which is total weight of two people including a driver on the vehicle.

The evaluation on the steering stability on the snow was made such that the driver comprehensively made subjective evaluations on a scale of 10 in terms of correctness of movement and response speed of the vehicle at the time of cornering on a test course having a road surface with compacted snow, and the index values are shown in Table 1 and Table 2 with the evaluation result of the tire of Comparative Example 1 being set to 100.

The evaluation on the traction on the snow was made such that acceleration time from 10 km/h up to 50 km/h traveling on the road with the compacted snow was measured, and the index values are shown in Table 1 and Table 2 with the evaluation result of the tire of Comparative Example 1 being set to 100.

The evaluation on the steering stability on the ice was made such that the driver comprehensively made subjective evaluations on a scale of 10 in terms of correctness of movement and response speed of the vehicle at the time of cornering on a test course having an ice road surface, and the index values are shown in Table 1 and Table 2 with the evaluation result of the tire of Comparative Example 1 being set to 100.

The evaluation on the steering stability on the dry road was made such that the driver comprehensively made subjective evaluations on a scale of 10 in terms of correctness of movement and response speed of the vehicle at the time of cornering on a test course having a dry road surface, and the index values are shown in Table 1 with the evaluation result of the tire of Comparative Example 1 being set to 100.

The evaluation on the hydroplaning resistance on the wet road is an evaluation on a function to suppress the hydroplaning phenomenon on the wet road, and was made such that the vehicle is accelerated from the stopping state on a wet road with a hydroplaning-evaluation water depth of 5 mm; a speed at which the grip of the tire loses and the tire begins to rotate without applying any traction on the road is measured; and the index values are shown in Table 1 with the evaluation result of the tire of Comparative Example 1 being set to 100.

In any performance evaluations above, the larger the index value is, the better the performance is.

TABLE 1

| | | Comp. Ex. 1 | Ex. 1 | Ex. 2 | Comp. Ex. 2 | Comp. Ex. 3 | Comp. Ex. 4 | Comp. Ex. 5 | Ex. 3 | Comp. Ex. 6 |
|---|---|---|---|---|---|---|---|---|---|---|
| Negative ratio | Nin | 27 | 27 | 27 | 27 | 30 | 30 | 30 | 33 | 33 |
| | Nout | 27 | 27 | 27 | 27 | 27 | 20 | 13 | 28 | 28 |
| | Nout/Nin | 1.00 | 1.00 | 1.00 | 1.00 | 0.90 | 0.67 | 0.43 | 0.85 | 0.85 |
| Performance evaluation | Groove-edge-component total length ratio | 1.00 | 1.05 | 1.23 | 1.33 | 1.00 | 1.00 | 1.00 | 1.10 | 1.00 |
| | Ratio of number of lateral groove | 1.00 | 1.50 | 1.75 | 3.00 | 1.00 | 1.00 | 1.00 | 1.50 | 1.00 |
| | Evaluation on steering stability on snow | 100 | 103 | 104 | 104 | 102 | 105 | 100 | 107 | 102 |
| | Evaluation on traction on snow | 100 | 105 | 107 | 109 | 100 | 99 | 95 | 103 | 100 |
| | Evaluation on steering stability on snow | 100 | 101 | 101 | 95 | 98 | 108 | 110 | 105 | 97 |
| | Evaluation on steering stability on dry road | 100 | 100 | 100 | 85 | 102 | 107 | 115 | 104 | 102 |
| | Evaluation on hydroplaning resistance on wet road | 100 | 100 | 100 | 101 | 101 | 99 | 80 | 102 | 100 |

TABLE 2

| | | Ex. 4 | Comp. Ex. 7 | Ex. 5 | Comp. Ex. 8 | Comp. Ex. 9 | Comp. Ex. 10 | Ex. 6 |
|---|---|---|---|---|---|---|---|---|
| Negative ratio | Nin | 27.0 | 30.0 | 27.0 | 30.0 | 27.0 | 30.0 | 27.8 |
| | Nout | 27.0 | 20.0 | 27.0 | 20.0 | 30.0 | 20.0 | 27.0 |
| | Nout/Nin | 1.00 | 0.67 | 1.00 | 0.67 | 1.11 | 0.67 | 0.97 |
| Performance evaluation | Groove-edge-component total length ratio | 1.03 | 1.03 | 1.30 | 1.30 | 1.05 | 1.05 | 1.05 |
| | Ratio of number of lateral groove | 1.5 | 1.0 | 3.0 | 1.0 | 1.5 | 1.5 | 1.5 |
| | Evaluation on steering stability on snow | 102 | 100 | 104 | 106 | 98 | 108 | 103 |
| | Evaluation on traction on snow | 104 | 102 | 108 | 103 | 104 | 104 | 105 |
| | Evaluation on steering stability on snow | 101 | 106 | 102 | 109 | 100 | 108 | 101 |
| | Evaluation on steering stability on dry road | 100 | 107 | 100 | 107 | 90 | 107 | 101 |
| | Evaluation on hydroplaning resistance on wet road | 100 | 99 | 100 | 99 | 97 | 99 | 100 |

As can be clearly understood from Table 1 and Table 2, the tires of Examples 1-6 exhibit excellent steering stability on the snow, ice and dry road, excellent traction performance on the snow road, and equal or more performance on the hydroplaning resistance evaluation on the wet road. Note that Comparative Examples 4, 5, 7, 8 and 10 exhibit favorable steering stability on the dry road, but exhibit worse performance on the traction performance on the snow and worse hydroplaning resistance evaluation result on the wet road.

EXPLANATION OF REFERENCE CHARACTERS 1, 1A, 1B Straight circumferential groove
2A, 2B, 2C, 2D Block array
3A, 3B, 3C, 3D Substantially opening lateral groove
4 Circumferential groove
5 Lateral groove
8 Closing groove
10 Tread surface
11, 12 Tread surface end
21, 22, 23, 24, 25, 26 Block
IN Inner tread surface
OUT Outer tread surface

The invention claimed is:

1. A studless tire having, on a tread surface, a plurality of straight circumferential grooves extending straightly in the circumferential direction and a tread surface end, thereby to define block arrays formed by a plurality of blocks arranged in the circumferential direction, the tread surface being divided by the widest groove among the straight circumferential grooves into an inner tread surface located on the inner side of a vehicle in a state where the tire is mounted on the vehicle, and an outer tread surface located on outer side of the vehicle in the state where the tire is mounted on the vehicle, wherein,
   when, among lateral grooves extending in an axial direction of the tire within each of the block arrays, an axial length of a lateral groove opening to at least one straight circumferential groove adjacent to the block array provided with the lateral groove in an area of the tread which is in contact with the road is referred to as a groove edge component,
   a proportion of the total length of the groove edge components on the inner tread surface to the total length of the groove edge components on the outer tread surface is 1.03-1.3, and,
   a proportion of a negative ratio of the outer tread surface to a negative ratio of the inner tread surface is 0.85-1.0;
   a number of lateral grooves opening to circumferential grooves when in contact with the road between the widest groove and an adjacent straight circumferential groove in the inner tread surface is greater than a number of lateral grooves opening to circumferential grooves when in contact with the road between the widest groove and an adjacent straight circumferential groove in the outer tread surface;
   wherein a groove width of a straight circumferential groove of the circumferential grooves on the outer tread surface is larger than a groove width of a straight circumferential groove of the circumferential grooves on the inner tread surface.

2. The studless tire according to claim 1, wherein the widest groove among the straight circumferential grooves is located closer to an inner tread surface end than to an outer tread surface end.

3. The studless tire according to claim 2, wherein the proportion of the negative ratio of the outer tread surface to the negative ratio of the inner tread surface is 0.85 or more and less than 0.95.

4. The studless tire according to claim 1, wherein all of the blocks arranged in the inner tread surface are elongated such that a width of the block in the axial direction of the tire is greater than a length in the circumferential direction of the tire.

* * * * *